(12) United States Patent
Bowen et al.

(10) Patent No.: US 6,614,440 B1
(45) Date of Patent: Sep. 2, 2003

(54) SYSTEM AND METHOD FOR LOAD BALANCING IN A MULTI-CHANNEL GRAPHICS SYSTEM

(75) Inventors: Andrew D. Bowen, San Jose, CA (US); Paul A. Simoncic, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/408,951

(22) Filed: Sep. 30, 1999

(51) Int. Cl.[7] .......................... G06F 13/18; G06F 12/02
(52) U.S. Cl. ................... 345/535; 345/543; 709/103; 709/104
(58) Field of Search .................. 345/535, 531, 345/543, 520, 530, 541; 711/170–173, 147, 151; 709/213, 103, 219, 104, 105, 107; 710/107, 110–114, 116, 305, 306, 309; 370/230, 232, 254; 348/14.02

(56) References Cited

U.S. PATENT DOCUMENTS

| | | | | |
|---|---|---|---|---|
| 5,455,627 A | | 10/1995 | Eitzmann et al. | 348/441 |
| 5,884,028 A | * | 3/1999 | Kindell et al. | 709/219 |
| 6,098,123 A | * | 8/2000 | Olnowich | 370/254 |
| 6,111,863 A | * | 8/2000 | Rostoker et al. | 348/14.02 |
| 6,178,486 B1 | * | 1/2001 | Gill et al. | 711/151 |
| 6,317,416 B1 | * | 11/2001 | Giroux et al. | 370/232 |
| 6,366,761 B1 | * | 4/2002 | Montpetit | 370/230 |
| 6,377,268 B1 | * | 4/2002 | Jeddeloh | 345/531 |
| 6,385,678 B2 | * | 5/2002 | Jacobs et al. | 709/213 |
| 6,389,493 B1 | * | 5/2002 | Barkley et al. | 710/110 |

OTHER PUBLICATIONS

Statement of Facts Concerning Certain Marketing Activities by Silicon Graphics, Inc.

* cited by examiner

*Primary Examiner*—Kee M. Tung
(74) *Attorney, Agent, or Firm*—Woodcock Washburn LLP (57) ABSTRACT

A pull-model system and method provides display data over a network to a plurality of display devices having the same or different video format requirements. Utilization of image memory bandwidth is balanced between the plurality of display devices. Based on image memory bandwidth requirements for the plurality of display devices, a bandwidth allocation table is generated to indicate a servicing priority for the display devices. A plurality of requests for pixel data are received and stored in a request buffer. The requests are then serviced in an order indicated by the bandwidth allocation table.

3 Claims, 7 Drawing Sheets

| Subsequent Channel | Next Channel | Active Channel |
|---|---|---|
| Ch0 Request (n+2) | Ch0 Request (n+1) | Ch0 Request (n) |
| Ch1 Request (n+2) | Ch1 Request (n+1) | Ch1 Request (n) |
| Ch2 Request (n+2) | Ch2 Request (n+1) | Ch2 Request (n) |
| Ch3 Request (n+2) | Ch3 Request (n+1) | Ch3 Request (n) |

FIG. 8

| Address | 0 | 1 | 2 | 3 | 4 | 5 | 6 | 7 | 8 | 9 | 10 | 11 | 12 | 13 | 14 | 15 | 16 | 17 | ... | 126 | 127 |
|---|---|---|---|---|---|---|---|---|---|---|---|---|---|---|---|---|---|---|---|---|---|
| Entry | 3 | 2 | 1 | 3 | 2 | 3 | 1 | 2 | 3 | 0 | 2 | 1 | 3 | 2 | 3 | 1 | 2 | 3 | ... | x | x |

| Channel | Data Rate | BAT Entries | Ratio |
|---|---|---|---|
| 0 | 30Mpix/sec | 8 | .09 |
| 1 | 80Mpix/sec | 20 | .22 |
| 2 | 120Mpix/sec | 30 | .33 |
| 3 | 130Mpix/sec | 33 | .36 |

FIG. 10

| Ch. 0 | Ch. 1 | Ch. 2 | Ch. 3 | Table Entry (Channel #) |
|---|---|---|---|---|
| 0.00 | 0.00 | 0.00 | 0.00 | |
| .08 | .22 | .33 | .36 | |
| .16 | .44 | .66 | .72 | |
| .24 | .66 | .99 | 1.08 | 0 (Channel 3) |
| .32 | .88 | 1.32 | .44 | 1 (Channel 2) |
| .40 | 1.10 | .65 | .88 | 2 (Channel 1) |
| .48 | .32 | .98 | 1.16 | 3 (Channel 3) |
| .56 | .54 | 1.31 | .52 | 4 (Channel 2) |
| .64 | .76 | .64 | .88 | |
| .72 | .98 | .97 | 1.24 | 5 (Channel 3) |
| .80 | 1.20 | 1.30 | .60 | 6 (Channel 1)<br>7 (Channel 2) |
| .88 | .42 | .63 | .96 | |
| .96 | .64 | .96 | 1.32 | 8 (Channel 3) |
| 1.04 | .86 | 1.29 | .68 | 9 (Channel 0)<br>10 (Channel 2) |
| .12 | 1.08 | .62 | 1.04 | 11 (Channel 1)<br>12 (Channel 3) |
| .20 | .30 | .95 | .40 | |
| .28 | .52 | 1.28 | .76 | 13 (Channel 2) |
| .36 | .74 | .61 | 1.12 | 14 (Channel 3) |
| .44 | .96 | .94 | .48 | |
| .52 | 1.18 | 1.27 | .84 | 15 (Channel 1)<br>16 (Channel 2) |
| .60 | .40 | .60 | 1.20 | 17 (Channel 3) |
| .68 | .62 | .93 | .56 | |
| .76 | .84 | 1.26 | .92 | 18 (Channel 2) |
| ⋮ | ⋮ | ⋮ | ⋮ | ⋮ |
| x | x | x | x | 123 |

SYSTEM AND METHOD FOR LOAD BALANCING IN A MULTI-CHANNEL GRAPHICS SYSTEM

BACKGROUND OF THE INVENTION

1. Field of the Invention

The invention relates in general to displaying information on a raster scan display device, and in particular to balancing utilization of image memory bandwidth between a plurality of display devices having the same or different display formats.

2. Related Art

Video formats were developed as methods of displaying picture element (or pixel) information on a raster display device such as a cathode-ray tube (CRT). The picture on a CRT screen is "painted" by an electron beam that is accelerated toward the phosphor coated screen by a high positive voltage near the face of the tube. When the electrons hit the screen, the phosphor emits visible light. The electron beam makes a horizontal scan by moving along a horizontal line across the screen from left to right, and makes a vertical scan by incrementally moving down in the vertical direction until it reaches the bottom of the screen. As the beam completes all the horizontal scans in a single vertical scan, a frame is displayed. Because the phosphor's light output decays exponentially with time, the entire picture (or frame) must be refreshed (redrawn) many times per second so that the viewer sees what appears to be a constant, unflickering picture. This is referred to as the vertical field rate.

Video display devices are characterized by a particular scan rate, which specifies the number of scanning lines per frame, and the vertical field rate. A display device is further characterized by a specified horizontal resolution which is the number of pixels per line, and vertical resolution which is the number of lines per raster scan frame. The timing relationship between these signals is governed by a synchronization method which is a complex combination of horizontal and vertical timing (pulse) information that controls the decoding of the video signal by a display device or other video processing equipment.

These video signal specifications are generally referred to as a video format. A video format represents a periodic sequence of a time-varying signal (or signals) that defines the method by which pixel information has been encoded, horizontal and vertical resolution and synchronization method.

Based on the operating requirements of traditional television equipment, a set of standards defining video formats were developed. However, new and varied applications for display devices requiring different scan rates and resolutions soon brought deviations from those standards. As a result, over the years, many different standards have been developed (e.g., NTSC, PAL, RS-343 and RGB), with each employing different scan rates.

The variety in display devices that require different video formats has led to interfacing problems between different display devices and existing systems. For example, for a computer to connect to different monitors, it's video output format must be modified to meet the requirements of the target monitor. Changing the video output format of some processing systems requires modifying the hardware, or configuring the hardware through a complex set of hardware-specific instructions. The hardware-only solution requires an alteration of hardware to change the video output format, which in some instances may necessitate as much as a new display generator. The second approach requires an expert knowledge of the operation of the hardware to develop a complex and tedious description of the format. Thus, both approaches tend to be inefficient and costly.

U.S. Pat. No. 5,455,627 to Eitzmann et al., which is incorporated herein by reference, discloses a more efficient solution to the problem of generating multiple video formats. Specifically, Eitzmann et al. disclose a programmable video output format generator that permits a processing system to drive different display devices with varying display format requirements. The programmable generator provides a compiler that generates display formats based on user input, and a state machine that generates all video signals with the requisite output formats.

There is now a need to provide support for multiple video formats in a networked graphics system.

SUMMARY OF THE INVENTION

The present invention includes a pull-model system and method that provides display data over a network to a plurality of display devices having the same or different video format requirements. In a network that has highly variable latency, the invention manages system resources so that requests from multiple requesters are handled in a well balanced, real-time manner. Requests for display data are kept relatively large (e.g., full lines of data such as 2000 pixels are requested) while the responses are kept relatively small (e.g., 16 pixels). The large requests provide immunity to the highly variable latency of the network while the small responses allow even load balancing.

The method of the invention balances utilization of image memory bandwidth between a plurality of display devices. The method includes the following steps: generating, based on image memory bandwidth requirements for the plurality of display devices, a bandwidth allocation table indicating a servicing priority for the display devices; receiving into a request buffer, from each display device, a plurality of requests for pixel data from the image memory; and servicing the plurality of requests in an order indicated by the bandwidth allocation table.

Because the requests are larger than the responses, the requests are updated in the request buffer as they are partially serviced. That is, if the sent pixel data represents all of the requested pixel data, the selected request is removed from the request buffer. However, if the sent pixel data does not represent all of the requested pixel data, then the selected request is updated in the request buffer to indicate that a portion of the requested pixel data has been sent.

The system of the invention includes a bandwidth allocation table indicating a servicing priority for the plurality of display devices; a request buffer for storing at least one request for pixel data from each of the plurality of display devices; and a controller for controlling servicing of the requests in the request buffer in an order specified by the bandwidth allocation table. The controller performs the following functions: selecting, based on the servicing priority indicated by the bandwidth allocation table, a request to be serviced from the plurality of requests in the request buffer; causing, for the selected request, at least a portion of requested pixel data to be retrieved from an image memory; causing the retrieved pixel data to be sent to the requesting display device; causing the selected request to be removed from the request buffer, if the sent pixel data represents all of the requested pixel data; and causing the selected request in the request buffer to be updated to indicate that the portion of the requested pixel data has been sent, if the sent pixel data does not represent all of the requested pixel data.

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

The preferred embodiment of the invention is discussed with reference to the figures in which like reference numbers indicate like elements. Furthermore, the left most digit of each reference number indicates the number of the figure in which the number is first referenced. While specific configurations and arrangements are discussed, it should be understood that this is done for illustration purposes only. A person skilled in the art will recognize that other configurations and arrangements may be used without departing from the spirit and scope of the invention.

Figure 1:
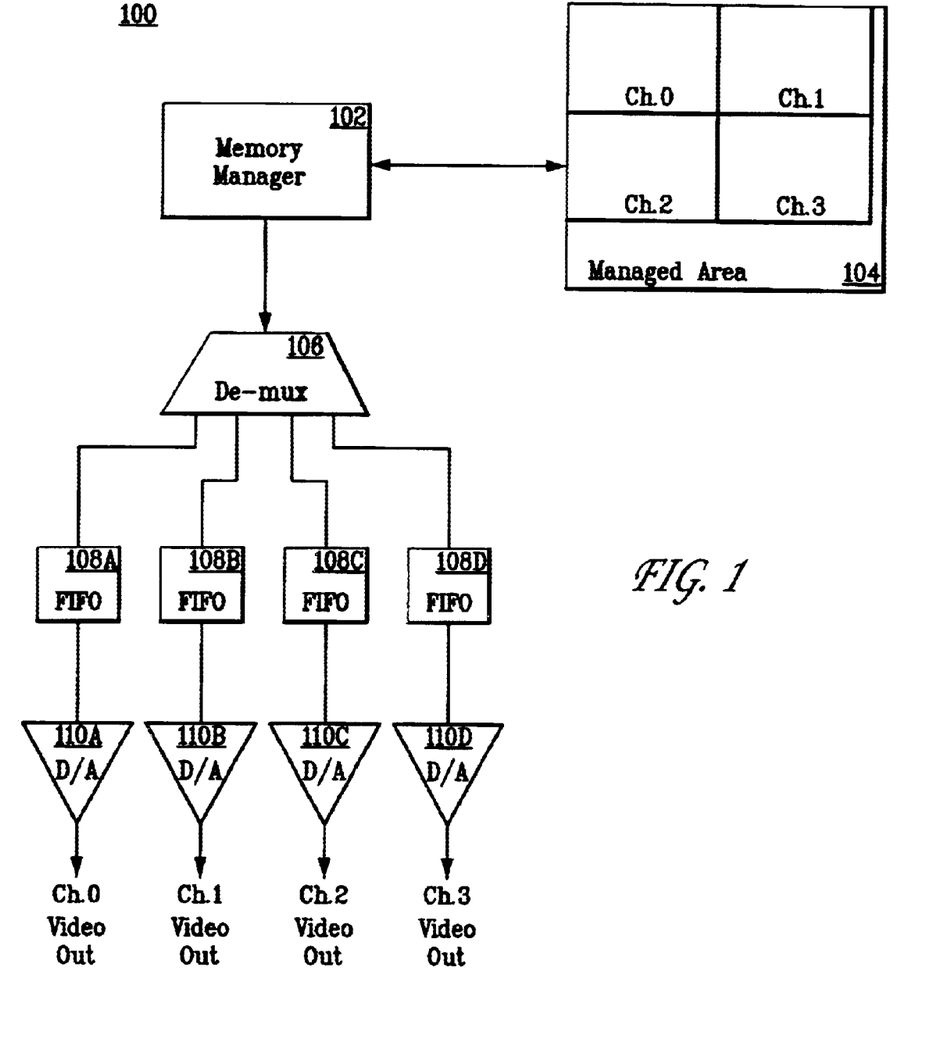
FIG. 1 is a block diagram of a push-model display management system.

FIG. 1 depicts a first-generation display management system 100. System 100 is known as a "push-model" system because a memory manager 102 takes display data (i.e., pixel information) from a managed area 104 (i.e., a frame buffer or image memory) and "pushes" the display data down to one or more display devices connected to video output channels 0–3. For example, memory manager 102 would retrieve display data for video channel 0 from the appropriate portion of managed area 104. Memory manager 102 then sends the display data through demuliplexer 106, FIFO 108A and digital to analog converter 110A for presentation to a display device (not shown) connected to channel 0 video output. Memory manager 102 may service a plurality of video channels by servicing each in sequence. For example, FIG. 1 depicts four channels which are substantially identical.

A problem with push-model display management systems such as that depicted in FIG. 1 is that they are inflexible. Memory manager 102 must be programmed to push the display data down to each display with the appropriate timing and in the appropriate video format. For example, it is desired to use four different displays on the four channels supported by system 100 as follows:

TABLE 1

| Video Output | Display Format | Data Rate |
|---|---|---|
| Channel 0 | 800 × 600 | 30M Pix/sec |
| Channel 1 | 1280 × 1024 | 80M Pix/sec |
| Channel 2 | 1600 × 1200 | 120M Pix/sec |
| Channel 3 | 1920 × 1080 | 130M Pix/sec |

As illustrated in Table 1, the channel 2 and channel 3 displays will require more display data to be pushed down from managed area 104 than will be required for the displays of channels 0 or 1. It is this information that must be programmed into memory manager 102. Further, whenever the displays attached to the various channels are changed, memory manager 102 must be reprogrammed. This is a shortcoming of the push-model. If not properly programmed, memory manager 102 may overfill or underfill FIFOs 108 resulting in either lost display data or pauses in the display on a certain channel because insufficient display data is available.

Figure 2:
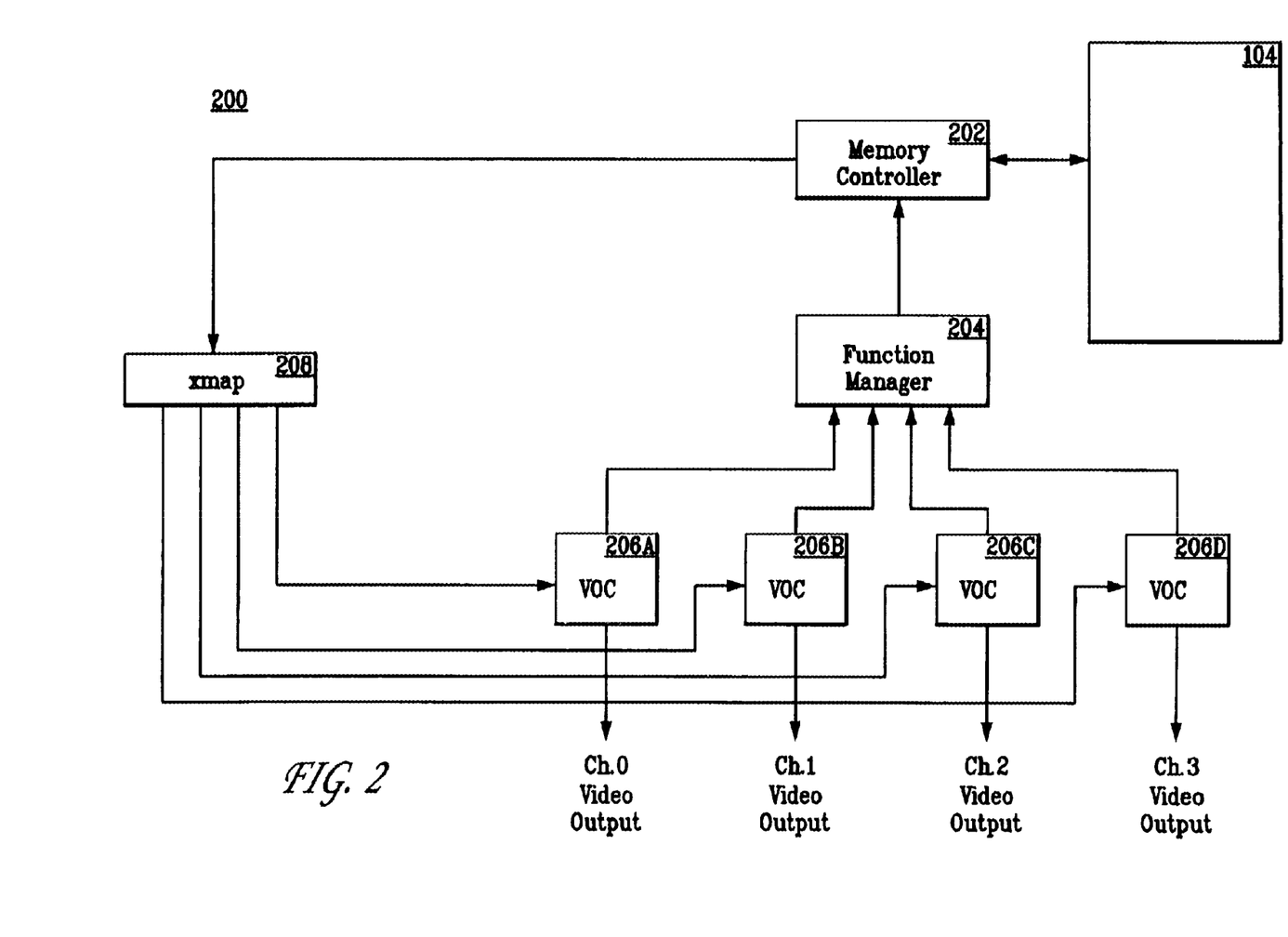
FIG. 2 is a block diagram of a pull-model display management system.

FIG. 2 illustrates a second-generation display management system 200. System 200 is a "pull-model" system because display data is pulled from managed area 104 as required by each display device. Each video channel of system 200 includes a video output controller 206. The video output controller is a state machine that has display timing programmed into it for a specific display. Programming of the video output controllers 206 is described in U.S. Pat. No. 5,455,627 to Eitzmann et al., which is incorporated herein by reference.

Each video output controller 206 communicates its display data needs to function manager 204. Function manager 204, acting as a demultiplexer, then communicates the individual video channel information needs to memory controller 202. Memory controller 202 retrieves the appropriate display data from managed area 104 and provides it to XMAP block 208. XMAP block 208 demultiplexes the display data received from memory controller 202 and provides the information to the appropriate video output controller 206. In addition, XMAP block 208 provides other functionality such as color mapping and gamma look-up.

System 200 allowed a user to program each video output controller for a particular display. Unlike system 100, the video output controllers 206 of system 200 are easily programmed by a user. Accordingly, modifying system 200 to accept various displays on the different output channels is straightforward. However, further improvements in display management systems are still desired. System 200 is not well suited for use in a networked graphic system. Each video output controller 206 makes many requests of memory controller 202 for display data as the information is required by the respective display device. In a networked graphics system with many video output channels, the large number of requests coming from a large number of video output controllers would provide high network traffic. In addition, networks inherently have unpredictable latency. System 200 assumes that a request will be promptly serviced by memory controller 202 in the same order as sent by the video output controllers 206. A networked graphics system, however, cannot guarantee either prompt servicing or servicing in a particular order. Unpredictable latencies may result in display data requests being received in an order different than they were sent and after the information is required by a particular display device.

The present invention includes a pull-model system and method that provides display data over a network to a plurality of display devices having the same or different video format requirements. In a network that has highly variable latency, the invention manages system resources so that requests from multiple requesters are handled in a well balanced, real-time manner. Requests for display data are kept relatively large (e.g., full lines of data such as 2000 pixels are requested) while the responses are kept relatively small (e.g., 16 pixels). The large requests provide immunity to the highly variable latency of the network while the small responses allow even load balancing.

Figure 3:
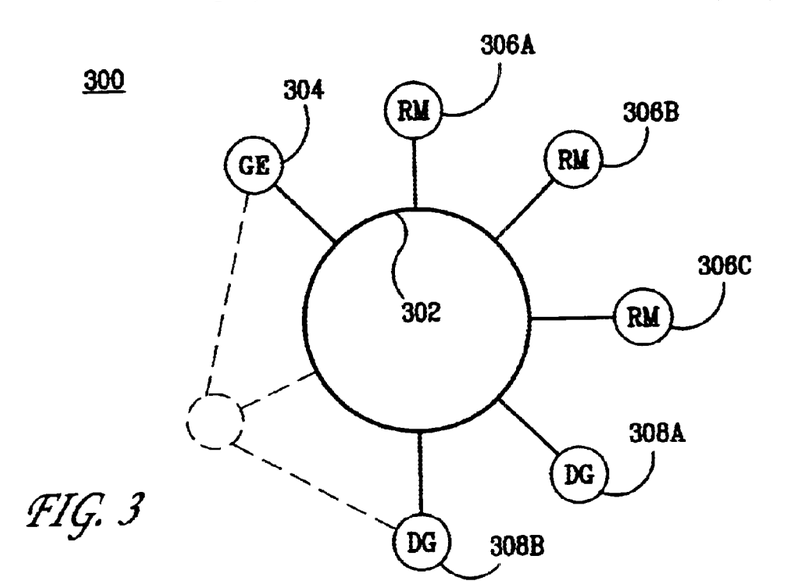
FIG. 3 is a block diagram of a networked graphics system.

FIG. 3 depicts a networked graphics system 300. System 300 includes a network 302 connecting a plurality of network elements including, for example, a geometry engine 304, a plurality of raster managers (RM) 306 and a plurality of display generators (DG) 308. Requests for display data are made by display generators 308 to raster managers 306. Each request is for a relatively large block of display data. For example, a full line of display data may be requested rather than a partial line as in the traditional pull-model system 200. When making such requests for large blocks of data, the problem presented to raster managers 306 is how to fairly allocate bandwidth. If a large request is processed in its entirety to the exclusion of other requests, the other requests may not be timely satisfied and one or more of the other video channels may be starved for display data. The invention solves this problem by responding to a large request for display data with small responses. For example, if a particular display generator 308 requests a 2,000 pixel block of display data, a particular raster manager 306 may respond to the request with 16 pixels of display data at a time. This is enough display data to satisfy the immediate need of the requesting display generator 308 yet small enough so that system resources are not monopolized by any one display generator 308.

As discussed in greater detail below, each raster manager 306 includes a channel memory (request buffer) and a bandwidth allocation table or BAT. The channel memory stores or buffers requests as they are received from the various display generators 308. The BAT contains an indication of an order of servicing the requests. Display generators requiring less bandwidth are allocated less bandwidth by the BAT. Similarly, display generators requiring large bandwidth are allocated larger amounts of bandwidth in a BAT. Each raster manager 306 refers to the BAT to determine an order of servicing requests for display data. In a preferred embodiment of the invention, each raster manager 306 includes an identical BAT.

Figure 4:
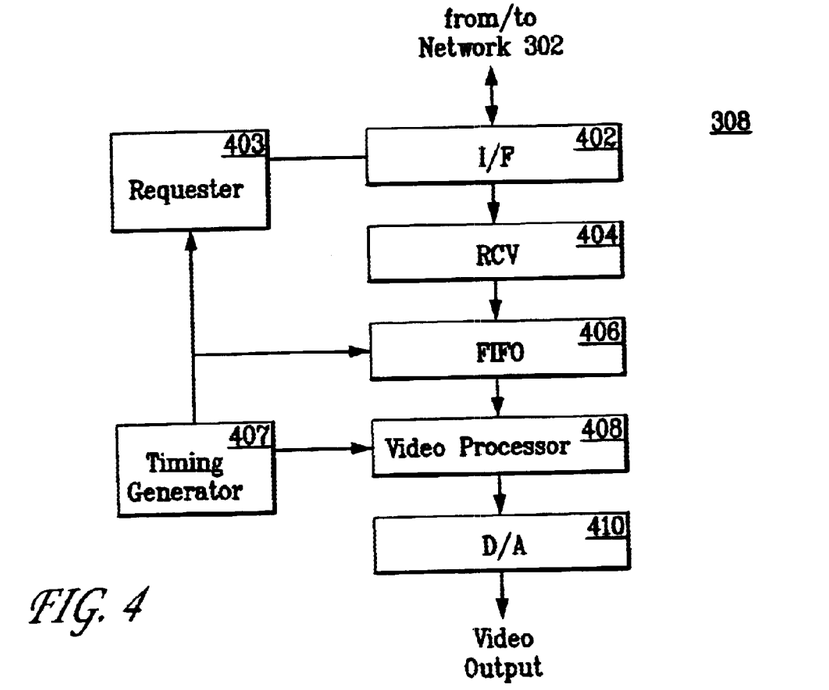
FIG. 4 is a block diagram of a display generator according to the present invention.

A block diagram of display generator 308 is shown in FIG. 4. Display generator 308 includes a network interface 402, a requestor 403, a receiver 404, a FIFO 406, a timing generator 407, a video processor 408 and a digital to analog converter 410. Network interface 402 provides an interface between display generator 308 and network 302. Requestor 403 generates display data requests to raster managers 306. Receiver 404 provides functions such as formatting of the display data and color index lookup. FIFO 406 provides buffering of received display data and data reordering as required. Video processor 408 provides gamma correction and filtering of the display data. Timing generator 407 provides timing for video processor 408, FIFO 406 and requestor 403. Digital to analog converter 410 converts the display data into analog signals to drive a display device (not shown). Request for display data that are generated by requester 403 are sent over network 302 to raster managers 306.

Figure 5:
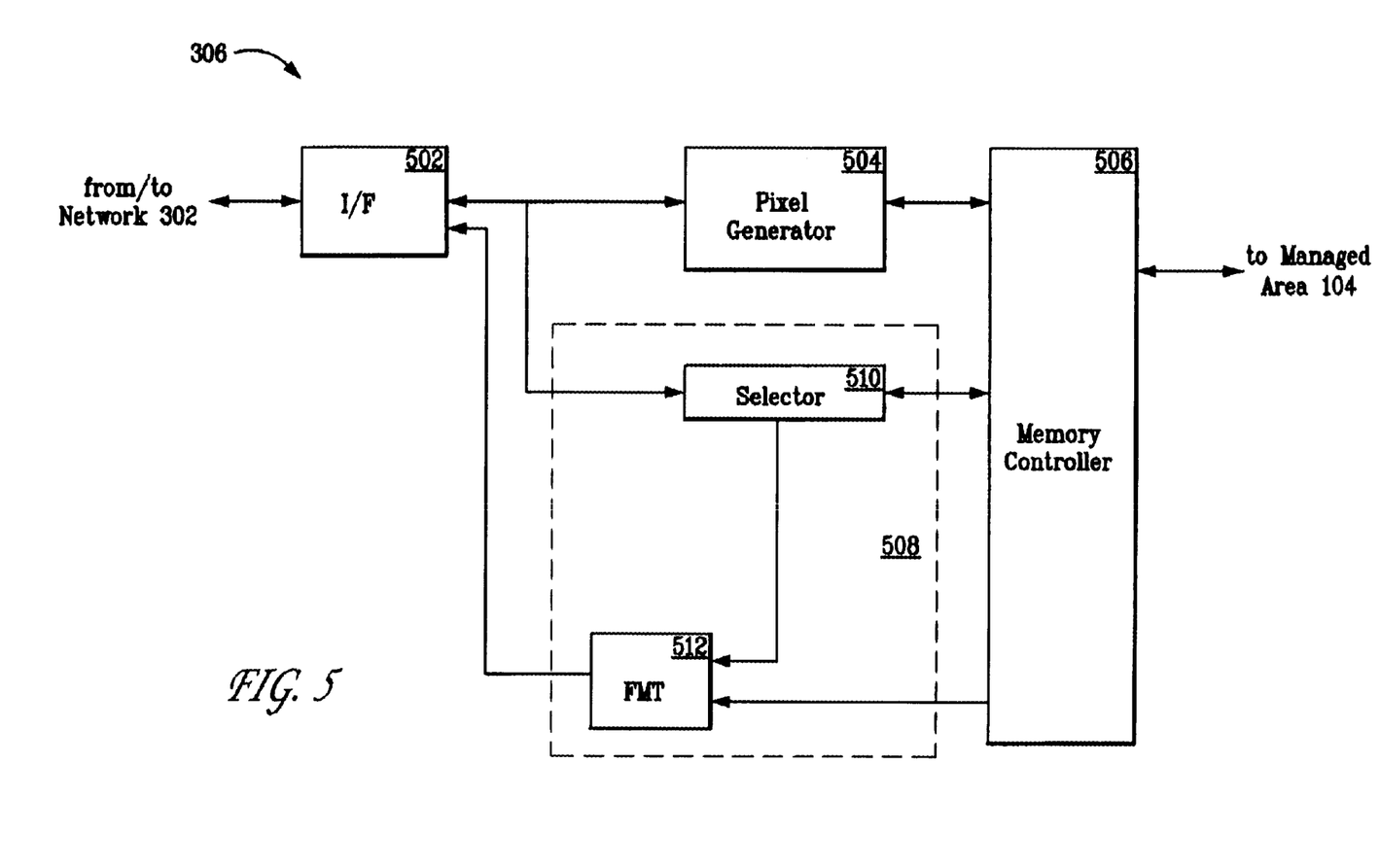
FIG. 5 is a block diagram of a raster manager according to the present invention.

FIG. 5 is a more detailed block diagram of raster manager 306. Raster manager 306 includes a network interface 502, a pixel generator 504, a memory controller 506, and a display response processor 508. Display response processor 508 includes a selector 510 and a formatter 512. Pixel generator 504 is a three-dimensional (3D) rendering processor that loads images into managed area 104 through memory controller 506. Display response processor 508 collects requests for display data from display generators 308 and decides which display generator 308 should be serviced next. Within display response processor 508, selector 510 grants responses to each request for display data based on a bandwidth allocation table or BAT. Formatter 512 receives the display data from managed area 104 via memory controller 506 and formats the display data for transmit to the appropriate display generator 308 over network 302.

Figure 6:
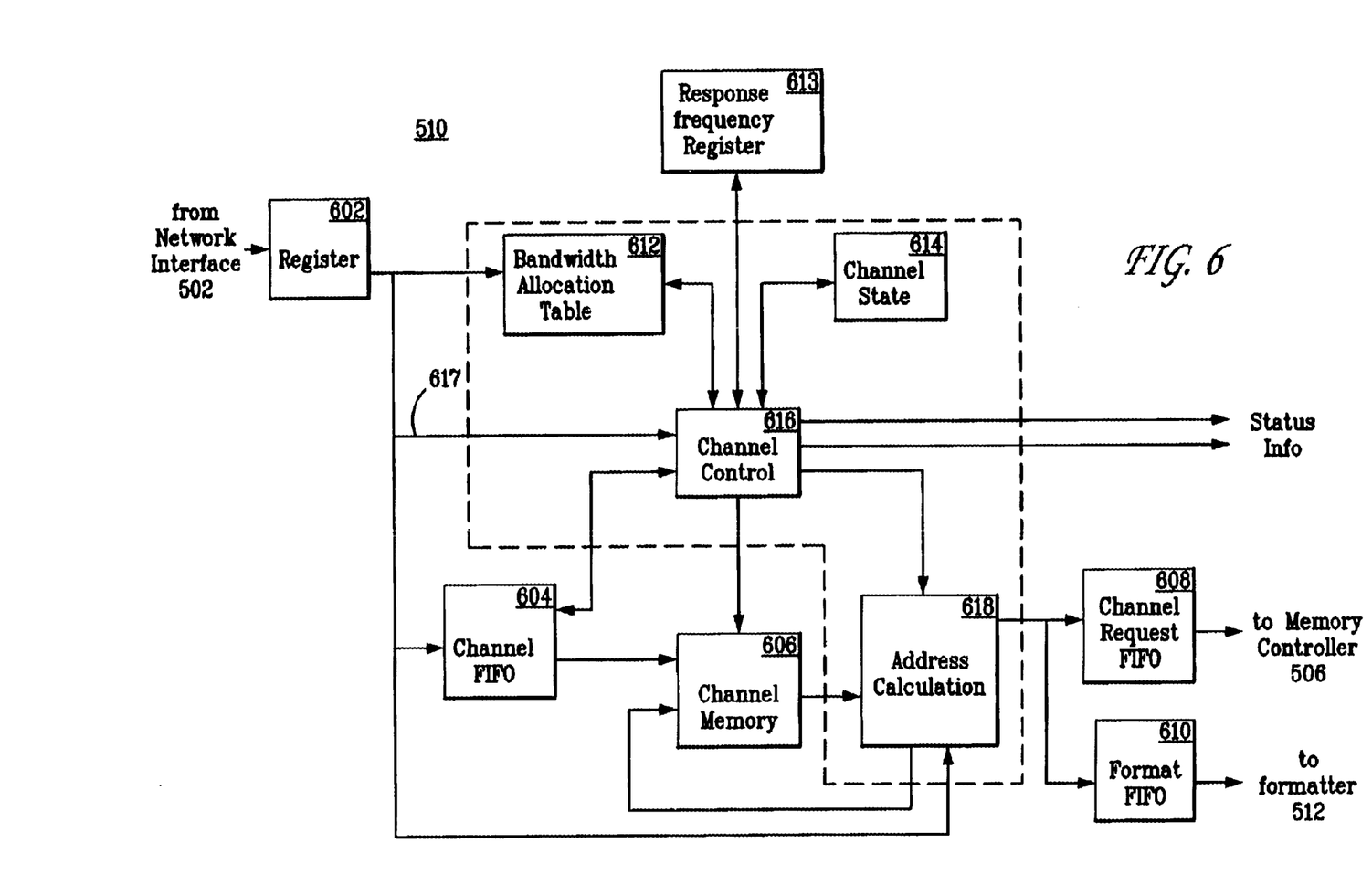
FIG. 6 is a more detailed block diagram of a selector 510 of FIG. 5 including associated circuitry from a display response processor 508.

FIG. 6 shows a more detailed block diagram of selector 510 including associated circuitry from display response processor 508. Selector 510 includes a register 602, a channel FIFO 604, a channel memory (or request buffer) 606, a channel request FIFO 608, a format FIFO 610, a bandwidth allocation table (BAT) 612, a response frequency register 613, a channel state block 614, a channel controller 616 and an address calculator 618. Register 602 receives requests for display data from network interface 502 (see FIG. 5). Channel FIFO is a shallow FIFO configured to store channel requests and channel loads for channel memory 606. Configuration data can be written directly to channel controller 616 via line 617 without going through channel FIFO 604. Channel memory 606 stores pending channel requests for display data.

Under control of channel controller 616, the channel requests in channel memory 606 are serviced in an order indicated by bandwidth allocation table (BAT) 612. Channel state block 614 stores channel configuration and status information. Address calculation block 618 passes memory requests for managed area 104 to channel request FIFO 608. Requests for format information are passed to format FIFO 610. Upon servicing of a channel request, address calculation block 618 will modify an uncompleted request and return it to channel memory 606 to be queued up for further processing. For example, if a request in channel memory 606 is for an entire line of pixel data (e.g., 2000 pixels) and each response to the request includes 16 pixels of data, then address calculation block 618 will modify the request in channel memory 606 to indicate that the 16 pixels are no longer needed. Once a request is fully filled, address calculation block 618 will remove the request from channel memory 606.

Response frequency register 613 is configured to control how often channel controller 616 dispatches a memory request from channel memory 606.

Example Implementation

Operation of the present invention is more fully explained through an illustrative example. A networked graphics system such as system 300 embodying the present invention provides the possibility of servicing a large number of disparate video display devices, e.g., 64 or more. However, to illustrate operation of the invention, a four channel example implementation is discussed. In this example, the four channels have display requirements as set forth in above in Table 1.

Figure 7:
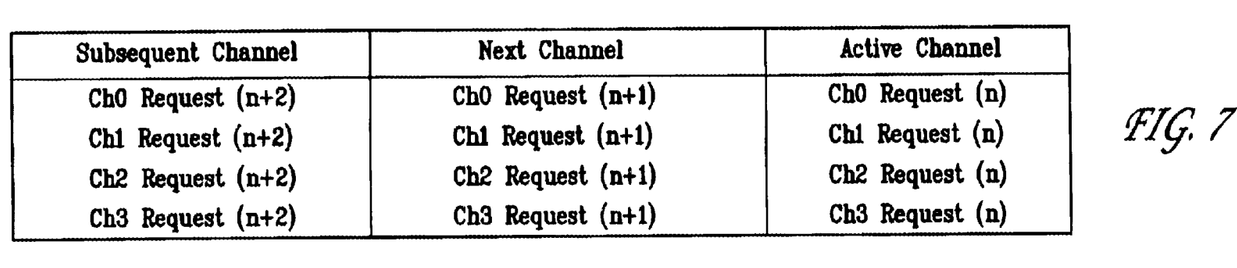
FIG. 7 is a table illustrating the structure and organization of a channel memory 606 of FIG. 6.

In this example implementation, channel memory 606 includes four channels, each channel of the channel memory corresponding to a display channel. A example of channel memory 606 is illustrated in FIG. 7. Note that each channel of channel memory 606 is three memory locations deep for storing up to three requests from a corresponding display generator. In this example, each request for display data made by a display generator 308 is for 2000 pixels of display data. In contrast, each response by a raster manager 306 is for 16 pixels of display data. Thus, each time a 16 pixel response is made, the request in the active channel of channel memory 606 is updated (i.e., address calculation block 618 subtracts 16 and returns the request to the channel memory) to reflect that the request has been partially filled. Once a request is completely filled, it is removed from the active channel of the channel memory and the next channel is advanced to the active channel.

Figure 8:
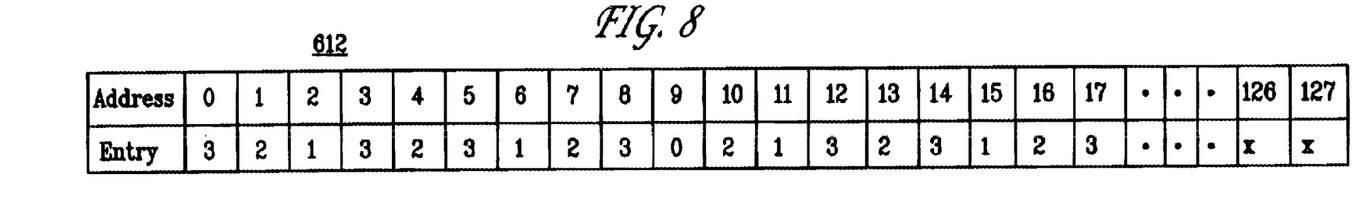
FIG. 8 is a table illustrating the structure and organization of a bandwidth allocation table (BAT) 612 of FIG. 6.

As previously discussed, which active channel request is to be serviced next is indicated by BAT 612. An example BAT 612 is illustrated in FIG. 8. The first row of BAT 612 represents the table address or position. It is preferred that the BAT have at least twice as many address as the number of display channels being serviced. However, a larger number will provide finer load balancing. In this example, the BAT has 128 entries. The second row of the BAT in FIG. 8 includes an indication of which channel should be next serviced by the graphics system. The indication that accomplishes this is a 5-bit address that indexes to the channel memory.

If all display channels had identical display data requirements, then the BAT could have an identical number of entries for each channel. This would cause each channel to receive the same amount of system bandwidth. Conversely, however, if a particular channel requires more system bandwidth, then it must have more entries in the BAT than a channel requiring less system bandwidth. A channel having more entries in the BAT will be serviced more often than a channel having less entries in the BAT.

Figure 9:
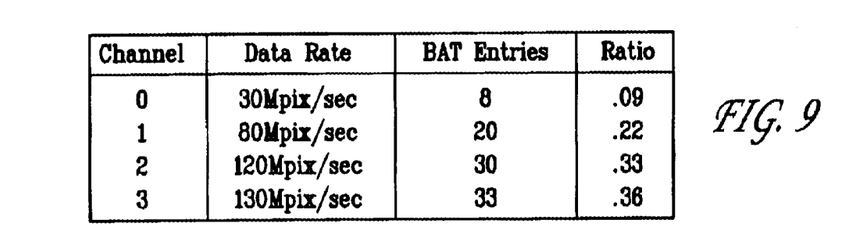
FIG. 9 is table illustrating four example channels and their respective bandwidth requirements.

In this example, the number of BAT entries to dedicate to each channel and the ordering of the entries may be determined as follows. Assuming that the graphics system provides a maximum bandwidth of 512 Mpix/sec (million pixels per second) and a BAT having 128 entries, each BAT entry represents 4 Mpix/sec of bandwidth (i.e., 512/128). Thus, a channel (e.g., channel 0) having a 30 Mpix/sec data rate would require 8 BAT entries (i.e., 30/4=7.5 which rounds up to 8). The table of FIG. 9 lists the number of BAT entries for each of the example channels.

Once the number of BAT entries is determined for each channel, the ordering of the entries may be determined as follows. First, the number of entries for each channel is divided by the total number of entries in the BAT to produce a ratio. The ratios for the example channels are listed in the last column of FIG. 9. For each channel, the ratio represents the percentage of the BAT entries that will be allocated to that particular channel.

Figure 10:
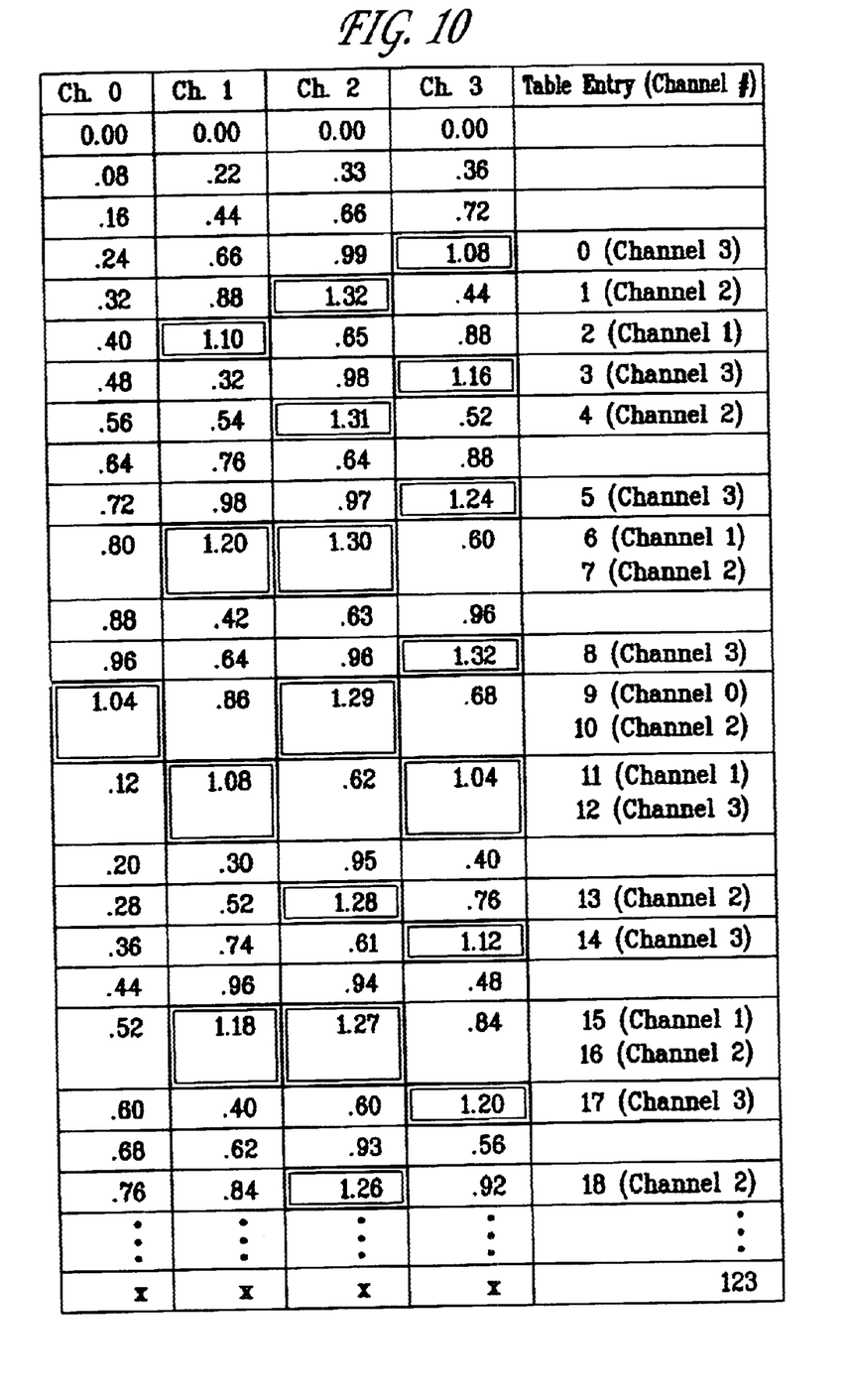
FIG. 10 is a table illustrating a method according to the invention for assigning bins of the BAT to the display channels.

Next, a counter is started for each channel. Each counter is incremented by its ratio. If a counter gets to 1.0 or greater, than an entry is added to the BAT for the particular channel that exceeds 1.0, and 1.0 is subtracted from that counter. This process is repeated until all BAT entries are filled. This process is illustrated in FIG. 10. Note in FIG. 10 that the counter for channel 3 is incremented by the largest ratio (i.e., 0.36). Therefore, the channel 3 counter reaches 1.0 most quickly, and the result is that channel 3 is allocated the most entries in the BAT. Conversely, the counter for channel 0 is incremented by the smallest ratio (i.e., 0.08). Therefore, the channel 0 counter seldom reaches 1.0, and the result is that channel 0 is allocated the least entries in the BAT.

In this preferred example, selector 510 may include response-frequency register (RFR) 613 (see FIG. 6). RFR 613 is configured to store a mean time between responses for the networked graphics system. Use of RFR 613 permits finer load balancing between the multiple displays and more efficient use of network bandwidth. For example, given a system response frequency of 1 GHz and a system bandwidth of 512 Mpix/sec, the system can generate a response pixel every two clock cycles (i.e., 1 GHz/512 Mpix/sec ≈2 cycles/pix). This equates to a response frequency of 2.0. Thus, a value of 2.0 could be loaded into RFR 613.

However, in this four channel example, the four display channels require only 360 Mpix/sec. Thus, the response frequency can be reduced to 3.0 (i.e., 1 GHz/360 Mpix/sec ≈3 cycles/pix). In this case, each entry or address in the BAT will represent 3 Mpix/sec (i.e., 360 Mpix/sec/128 entries) instead of 4 Mpix/sec (i.e., 512 Mpix/sec/128 entries). This finer granularity in the BAT permits system bandwidth to be more accurately allocated to individual display channels.

While the invention has been described and illustrated with a certain degree of particularity, it is understood that those skilled in the art will recognize a variety of applications and appropriate modifications within the spirit of the invention and the scope of the claims.

What is claimed is:

1. A method for balancing utilization of image memory bandwidth between a plurality of display devices having different bandwidth requirements, the method comprising:

(a) receiving, for each display device, an image memory bandwidth requirement;

(b) generating, based on said image memory bandwidth requirements for said plurality of display devices, a bandwidth allocation table indicating a servicing priority for said display devices;

(c) receiving into a request buffer, from each display device, a plurality of requests for pixel data from the image memory;

(d) selecting, based on said servicing priority indicated by said bandwidth allocation table, a request to be serviced from said plurality of requests in said request buffer;

(e) for said selected request, retrieving at least a portion of requested pixel data from the image memory;

(f) sending said retrieved pixel data to the requesting display device;

(g) if said sent pixel data represents all of said requested pixel data, removing said selected request from said request buffer;

(h) if said sent pixel data does not represent all of said requested pixel data, updating said selected request in said request buffer to indicate that said portion of said requested pixel data has been sent; and (i) repeating steps (d)–(i) for the plurality of requests received in step (c).

2. A method for balancing utilization of image memory bandwidth between a plurality of display devices, the method comprising:

(a) generating, based on image memory bandwidth requirements for said plurality of display devices, a bandwidth allocation table indicating a servicing priority for said display devices;

(b) receiving into a request buffer, from each display device, a plurality of requests for pixel data from the image memory; and (c) servicing said plurality of requests in an order indicated by said bandwidth allocation table, wherein said servicing step comprises:

(i) selecting, based on said servicing priority indicated by said bandwidth allocation table, a request to be serviced from said plurality of requests in said request buffer;

(ii) for said selected request, retrieving at least a portion of requested pixel data from the image memory;

(iii) sending said retrieved pixel data to the requesting display device;

(iv) if said sent pixel data represents all of said requested pixel data, removing said selected request from said request buffer;

(v) if said sent pixel data does not represent all of said requested pixel data, updating said selected request in said request buffer to indicate that said portion of said requested pixel data has been sent; and (vi) repeating steps (i)–(v) for the plurality of requests received in step (b).

3. A system for balancing utilization of image memory bandwidth between a plurality of display devices having different bandwidth requirements, comprising:

a bandwidth allocation table indicating a servicing priority for said plurality of display devices;

a request buffer for storing at least one request for pixel data from each of said plurality of display devices; and a controller for controlling servicing of said requests in said request buffer in an order specified by said bandwidth allocation table, wherein said controller comprises:

means for selecting, based on said servicing priority indicated by said bandwidth allocation table, a request to be serviced from said plurality of requests in said request buffer;

means for causing, for said selected request, at least a portion of requested pixel to be retrieved from an image memory;

means for causing said retrieved pixel data to be sent to the requesting display device;

means for causing said selected request to be removed from said request buffer, if said sent pixel data represents all of said requested pixel data; and means for causing said selected request in said request buffer to be updated to indicate that said portion of said requested pixel data has been sent, if said sent pixel data does not represent all of said requested pixel data.

* * * * *